US009674866B2

(12) United States Patent
Li et al.

(10) Patent No.: US 9,674,866 B2
(45) Date of Patent: Jun. 6, 2017

(54) SUBFRAME SCHEDULING METHOD AND SYSTEM, NETWORK DEVICE AND TERMINAL

(71) Applicant: ZTE Corporation, Shenzhen, Guangdong (CN)

(72) Inventors: Xincai Li, Shenzhen (CN); Bo Dai, Shenzhen (CN); Shuqiang Xia, Shenzhen (CN); Jing Shi, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/439,044

(22) PCT Filed: Jul. 29, 2013

(86) PCT No.: PCT/CN2013/080365
§ 371 (c)(1),
(2) Date: Apr. 28, 2015

(87) PCT Pub. No.: WO2013/167090
PCT Pub. Date: Nov. 14, 2013

(65) Prior Publication Data
US 2015/0264708 A1    Sep. 17, 2015

(30) Foreign Application Priority Data
Oct. 29, 2012    (CN) .......................... 2012 1 0420780

(51) Int. Cl.
H04W 4/00      (2009.01)
H04W 72/12    (2009.01)
(Continued)

(52) U.S. Cl.
CPC ....... H04W 72/1289 (2013.01); H04L 1/1864 (2013.01); H04L 1/1887 (2013.01);
(Continued)

(58) Field of Classification Search
USPC .......................... 370/329, 330, 331, 333, 338
See application file for complete search history.

(56) References Cited

U.S. PATENT DOCUMENTS

| 8,824,366 B2 * | 9/2014 | Lee ...................... H04J 11/0069 370/206 |
| 2011/0122825 A1 * | 5/2011 | Lee ...................... H04J 11/0069 370/328 |

(Continued)

FOREIGN PATENT DOCUMENTS

| CN | 102202408 A | 9/2011 |
| CN | 102215590 A | 10/2011 |

(Continued)

OTHER PUBLICATIONS

Supplementary European Search Report in European application No. 13787025.9, mailed on Oct. 29, 2015.

(Continued)

Primary Examiner — Zewdu A Beyen
(74) Attorney, Agent, or Firm — Oppendahl Patent Law Firm LLC

(57) ABSTRACT

Disclosed is a subframe scheduling method, which includes: a network side configures a transmission mode, wherein the transmission mode includes at least a multi-subframe scheduling transmission way; the network side selects a corresponding control information format according to the transmission mode, transmits Downlink Control Information (DCI) corresponding to the control information format, and then performs subframe scheduling according to the DCI. Further disclosed are a subframe scheduling system, a network device and a terminal. By means of the disclosure, the multi-subframe scheduling can be used under the condition in which user channel state information is relatively stable, thereby being able to reduce control signalling over- (Continued)

heads, save system resources and improve the scheduling flexibility.

19 Claims, 6 Drawing Sheets

(51) Int. Cl.
*H04W 28/06* (2009.01)
*H04W 74/00* (2009.01)
*H04L 1/18* (2006.01)
*H04L 5/00* (2006.01)
*H04L 27/00* (2006.01)
*H04L 1/00* (2006.01)

(52) U.S. Cl.
CPC ........... *H04L 5/0055* (2013.01); *H04W 28/06* (2013.01); *H04W 74/004* (2013.01); *H04L 1/0001* (2013.01); *H04L 1/0038* (2013.01); *H04L 5/0053* (2013.01); *H04L 27/0008* (2013.01); *H04W 72/12* (2013.01)

(56) References Cited

U.S. PATENT DOCUMENTS

2013/0016686 A1 1/2013 Li et al.
2013/0021988 A1 1/2013 Chen

FOREIGN PATENT DOCUMENTS

CN 102625456 A 8/2012
EP 2509379 A1 10/2012

OTHER PUBLICATIONS

PDCCH Enhancement for Different TDD UL-DL Configuration on Different Bands, mailed on Feb. 3, 2012.
Considerations on downlink control signaling enhancement, mailed on Aug. 16, 2011.
International Search Report in international application No. PCT/CN2013/080365, mailed on Oct. 31, 2013.
English Translation of the Written Opinion of the International Search Authority in international application No. PCT/CN2013/080365, mailed on Oct. 31, 2013.

* cited by examiner

| DCI Subframe number | 0 | 1 | 2 | 3 | 4 | 5 | 6 | 7 | 8 | 9 | | |
|---|---|---|---|---|---|---|---|---|---|---|---|---|
| HARQ process number | 2(A) | 3(B) | 4(C) | 5(D) | | | 2(E) | 3(B+) | 5(F) | 4(C+) | | |

ACK/NACK                    1001

SUBFRAME SCHEDULING METHOD AND SYSTEM, NETWORK DEVICE AND TERMINAL

TECHNICAL FIELD

The disclosure relates to the field of wireless communications, and in particular to a subframe scheduling method and system, a network device and a terminal.

BACKGROUND

In a Long Term Evolution/Long Term Evolution Advance (LTE/LTE-A) system, a terminal demodulates a Physical Downlink Share Channel (PDSCH) and sends a Physical Uplink Share Channel (PUSCH) according to a Downlink Control Information (DCI) scheduling indicator which is sent by a base station through a Physical Downlink Control Channel (PDCCH), so as to complete receiving of downlink data and sending of uplink data.

Multiple DCI formats are defined in the LTE/LTE-A system; DCI Format 0 and DCI Format 4 can be used for uplink scheduling, and DCI Format 1, DCI Format 1A, DCI Format 1B, DCI Format 1C, DCI Format 1D, DCI Format 2, DCI Format 2A, DCI Format 2B, DCI Format 2C, DCI Format 3 and DCI Format 3A can be used for downlink scheduling. The transmitted control information includes some scheduling configuration parameters, and the scheduling configuration parameters are generally divided into resource configuration parameters and transmission configuration parameters, wherein the resource configuration parameters can be specifically resource block allocation parameters, and the transmission configuration parameters can be specifically carrier indicator, format identity, Modulation and Coding Scheme (MCS) level and Redundancy Version (RV), New Data Indicator (NDI), Transmit Power Control (TPC) command and so on.

In addition, for compromise of the control signalling overhead and the scheduling flexibility, in the LTE/LTE-A system, a synchronous adaptive or non-adaptive Hybrid Automatic Repeat Request (HARQ) mechanism is adopted for uplink, and an asynchronous adaptive HARQ mechanism is adopted for downlink, and the downlink DCI needs to include an HARQ process number of each data packet for differentiating. In a Frequency Division Duplexing (FDD) system, the supported maximum number of HARQ processes is 8, and the DCI includes 3 bits for indicating the process number used by the data packet. In a Time Division Duplexing (TDD) system, the supported maximum number of HARQ processes is 15, and the DCI includes 4 bits for indicating the process number used by the data packet.

In the existing LTE technology, two resource indicating ways for data transmission, namely dynamic scheduling and semi-static scheduling, are defined for data packet transmission of a same user. Under the dynamic scheduling, there is a piece of DCI corresponding to a transmission data block of each subframe. Under the semi-static scheduling, the base station sends the DCI only when the semi-static scheduling is started, and the terminal sends and receives new data packets at certain time intervals and using the same scheduling configuration parameter. In addition, a Transmission Time Interval (TTI) bundling scheme can also be adopted for uplink in the LTE system, but it is only transmission of different redundancy versions of a same data packet by multiple consecutive subframes, which influences the overall spectrum efficiency.

In some scenarios, such as a Small Cell (SC) and multi-user, multi-packet services, the factors restricting system capacity is mainly capacity of a control channel; if the dynamic scheduling is adopted, each data packet of each user needs a piece of DCI corresponding thereto, which inevitably needs high control signalling overheads and occupies a lot of valuable resources; even an Enhanced Physical Downlink Control Channel (ePDCCH) is used, there is still the problem of high control signalling overheads; if the semi-static scheduling is used, the scheduling flexibility is poor.

SUMMARY

In view of the above, the disclosure is mainly intended to provide a subframe scheduling method and system, a network device and a terminal, which can reduce control signalling overheads, save system resources and improve the scheduling flexibility.

To this end, the technical solutions of the disclosure are implemented as follows.

A subframe scheduling method is provided, which includes:

a network side configures a transmission mode, wherein the transmission mode includes at least a multi-subframe scheduling transmission way; and the network side selects a corresponding control information format according to the transmission mode, transmits DCI corresponding to the control information format, and then performs subframe scheduling according to the DCI.

The transmission mode may differentiate between single-subframe scheduling and multi-subframe scheduling by at least one of the following ways:

differentiating through a DCI format;
differentiating through a search space;
differentiating through subframe indication information in the DCI; and
differentiating through high-layer signalling or the transmission type of a random access channel.

The multi-subframe scheduling transmission way may include:

all data packets carried by each subframe of multiple subframes are new data packets, wherein each new data packet is configured by using a scheduling configuration parameter in the DCI;

or, all the data packets carried by each subframe of the multiple subframes are retransmitted data packets, wherein each retransmitted data packet is configured by using the scheduling configuration parameter in the DCI;

or, the multiple subframes carry a mixture of new data packets and retransmitted data packets, wherein the new data packets are configured by using the scheduling configuration parameter in the DCI, and the retransmitted data packets are configured by using a scheduling configuration parameter during a precious scheduling or a scheduling configuration parameter during an initial scheduling;

or, each subframe of the multiple subframes transmits a same data packet that is configured by using the scheduling configuration parameter in the DCI.

The DCI may include at least one or more of: carrier indicator, resource block indicator, modulation and coding level, power control indicator, group number information of an HARQ process number, and state information of a scheduled subframe;

wherein the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit data packets.

The scheduled subframe may include more than one predefined consecutive or discrete subframes, or subframe(s) indicated by subframe scheduling information in the DCI;

wherein the subframe scheduling information includes: a starting subframe number and a finishing subframe number of scheduled subframes, or the starting subframe number and a number of consecutively scheduled subframes, or a number of consecutively scheduled subframes after a subframe where the DCI is.

The multiple scheduled subframes may share a same group number of HARQ process numbers, and a process number of each scheduled subframe may correspond to a process number in a group with the group number.

Multiple scheduled downlink subframes may provide an Acknowledgement (ACK)/Negative Acknowledgement (NACK) feedback together through a Physical Uplink Control Channel (PUCCH).

The DCI may be transmitted on one or more predefined subframes.

When the DCI is scheduling information related to a downlink data channel, the downlink data channel may be transmitted on one or more subframes transmitting the DCI, or the downlink data channel may be transmitted on one or more subframes after the subframe(s) transmitting the DCI;

when the DCI is scheduling information related to an uplink data channel, the uplink data channel may be transmitted on one or more subframes after the subframe(s) transmitting the DCI.

An uplink subframe transmitting feedback information of the downlink data channel may be determined according to a last downlink subframe transmitting the downlink data channel.

A subframe scheduling method is also provided, which includes:

a terminal receives a transmission mode configured by the network side, wherein the transmission mode includes at least the multi-subframe scheduling transmission way; and the terminal acquires the DCI from the network side according to the control information format corresponding to the transmission mode, and then receives the downlink data or sends the uplink data according to the DCI.

The transmission mode may differentiate between single-subframe scheduling and multi-subframe scheduling by at least one of the following ways:

differentiating through the DCI format;

differentiating through the search space;

differentiating through the subframe indication information in the DCI; and differentiating through the high-layer signalling or the transmission type of the random access channel.

The multi-subframe scheduling transmission mode may include:

all the data packets carried by each subframe of the multiple subframes are the new data packets, wherein each new data packet is configured by using the scheduling configuration parameter in the DCI;

or, all the data packets carried by each subframe of the multiple subframes are retransmitted data packets, wherein each retransmitted data packet is configured by using the scheduling configuration parameter in the DCI;

or, the multiple subframes carry a mixture of new data packets and retransmitted data packets, wherein the new data packets are configured by using the scheduling configuration parameter in the DCI, and the retransmitted data packets are configured by using a scheduling configuration parameter during a previous scheduling or a scheduling configuration parameter during an initial scheduling;

or, each subframe of the multiple subframes transmits a same data packet that is configured by using the scheduling configuration parameter in the DCI.

The DCI may include at least one or more of: carrier indicator, resource block indicator, modulation and coding level, power control indicator, group number information of an HARQ process number, and state information of a scheduled subframe;

wherein the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit data packets.

The scheduled subframe may include more than one predefined consecutive or discrete subframes, or subframe(s) indicated by the subframe scheduling information in the DCI;

wherein the subframe scheduling information includes: a starting subframe number and a finishing subframe number of scheduled subframes, or the starting subframe number and a number of consecutively scheduled subframes, or a number of consecutively scheduled subframes after a subframe where the DCI is.

The multiple scheduled subframes may share a same group number of HARQ process numbers, and a process number of each scheduled subframe may correspond to a process number in a group with the group number.

The multiple scheduled downlink subframes may provide an ACK/NACK feedback together through a PUCCH.

The DCI may be transmitted on one or more predefined subframes.

When the DCI is the scheduling information related to the downlink data channel, the downlink data channel may be transmitted on one or more subframes transmitting the DCI, or the downlink data channel may be transmitted on one or more subframes after the subframe(s) transmitting the DCI;

when the DCI is the scheduling information related to the uplink data channel, the uplink data channel may be transmitted on one or more subframes after the subframe(s) transmitting the DCI.

The uplink subframe transmitting the feedback information of the downlink data channel may be determined according to a last downlink subframe transmitting the downlink data channel.

A network device is also provided, which includes: a transmission mode configuration module, a downlink control information transmission module and a subframe scheduling module; wherein, the transmission mode configuration module is configured to configure a transmission mode, wherein the transmission mode includes at least the multi-subframe scheduling transmission way;

the downlink control information transmission module is configured to select the corresponding control information format according to the transmission mode, and transmit the DCI corresponding to the control information format to a terminal; and the subframe scheduling module is configured to perform subframe scheduling according to the DCI.

A terminal is also provided, which includes: a reception module, an acquisition module and a subframe managing module; wherein, the reception module is configured to receive a transmission mode configured by the network side, wherein the transmission mode includes at least a multi-subframe scheduling transmission way;

the acquisition module is configured to acquire the DCI from the network side according to the control information format corresponding to the transmission mode; and the subframe managing module is configured to receive the downlink data or send the uplink data according to the DCI.

A subframe scheduling system is also provided, which includes: the aforementioned network device and the aforementioned terminal.

Through the subframe scheduling method and system, the network device and the terminal of the disclosure, the network side configures a transmission mode, wherein the transmission mode includes at least the multi-subframe scheduling transmission way; the network side selects the corresponding control information format according to the transmission mode, transmits the DCI corresponding to the control information format, and then performs subframe scheduling according to the DCI. By means of the disclosure, the multi-subframe scheduling can be used under the condition in which user channel state information is relatively stable, thereby being able to reduce control signalling overheads, save system resources and improve the scheduling flexibility.

DETAILED DESCRIPTION

The basic idea of the disclosure is that: a network side configures a transmission mode, wherein the transmission mode includes at least the multi-subframe scheduling transmission way; the network side selects the corresponding control information format according to the transmission mode, transmits the DCI corresponding to the control information format, and then performs subframe scheduling according to the DCI.

Figure 1:
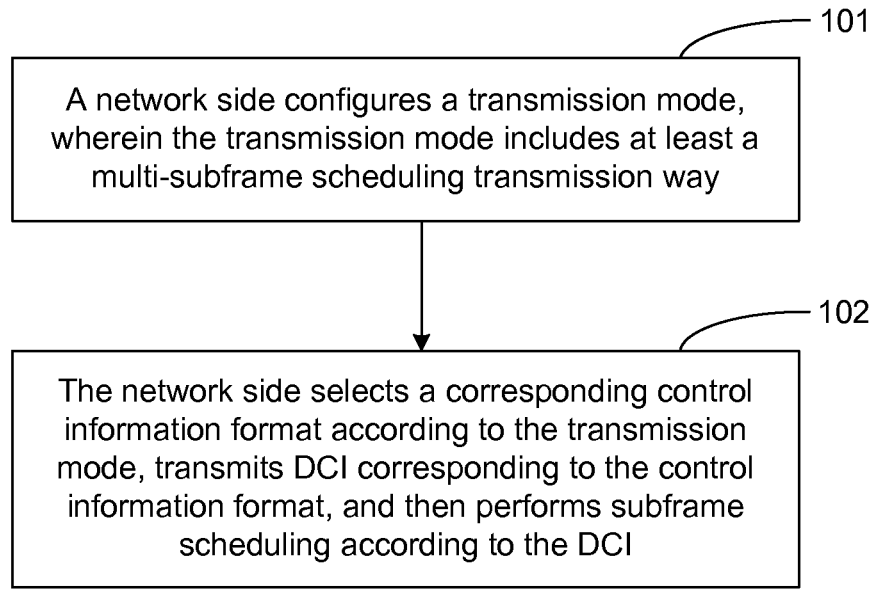
FIG. 1 is a flowchart of a subframe scheduling method according to an embodiment of the disclosure.

FIG. 1 is a flowchart of a subframe scheduling method according to an embodiment of the disclosure; as shown in FIG. 1, the method includes the following steps.

Step 101, a network side configures a transmission mode, wherein the transmission mode includes at least a multi-subframe scheduling transmission way;

here, the transmission mode may only include the multi-subframe scheduling transmission way, and may also include both a single-subframe scheduling transmission way and the multi-subframe scheduling transmission way.

Step 102, the network side selects the corresponding control information format according to the transmission mode, transmits the DCI corresponding to the control information format, and then performs subframe scheduling according to the DCI.

Optionally, the transmission mode differentiates between the single-subframe scheduling and the multi-subframe scheduling by at least one of the following ways:

the first way: differentiating through the DCI format; specifically, the transmission mode can define two DCI formats, one of which is used for the single-subframe scheduling, and the other is used for the multi-subframe scheduling; a base station indicates by selecting the DCI format whether the single-subframe scheduling or the multi-subframe scheduling is used;

the second way: differentiating through the search space; here, the search space means a scope of resources in which the terminal detects the DCI; the transmission mode can indicate that a public search space includes the related configuration parameter of the single-subframe scheduling, a user-specific search space includes the configuration parameter of the multi-subframe scheduling; correspondingly, when the base station performs subframe scheduling, only the public search space is configured for the single-subframe scheduling, and the user-specific search space is configured for the multi-subframe scheduling;

the third way: differentiating through the subframe indication information in the DCI; and the fourth way: differentiating through the high-layer signalling or the transmission type of the random access channel.

Optionally, the multi-subframe scheduling transmission mode way includes:

all the data packets carried by each subframe of the multiple subframes are the new data packets, wherein each new data packet is configured by using the scheduling configuration parameter in the DCI;

or, all the data packets carried by each subframe of the multiple subframes are retransmitted data packets, wherein each retransmitted data packet is configured by using the scheduling configuration parameter in the DCI;

or, the multiple subframes carry a mixture of new data packets and retransmitted data packets, wherein the new data packets are configured by using the scheduling configuration parameter in the DCI, and the retransmitted data packets are configured by using a scheduling configuration parameter during a previous scheduling or a scheduling configuration parameter during an initial scheduling;

or, each subframe of the multiple subframes transmits a same data packet that is configured by using the scheduling configuration parameter in the DCI.

Optionally, the DCI at least includes one or more of the followings: carrier indicator, resource block indicator, modulation and coding level, power control indicator, group number information of an HARQ process number, and state information of a scheduled subframe; wherein the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit data packets.

Optionally, the scheduled subframe includes:

N predefined consecutive or discrete subframes;

or subframe(s) indicated by the subframe scheduling information in the DCI, wherein the subframe scheduling information includes: the starting subframe number and the finishing subframe number of scheduled subframes;

or the starting subframe number and the number of consecutively scheduled subframes;

or a number of consecutively scheduled subframes after a subframe where the DCI is.

Optionally, the multiple scheduled subframes share a same group number of HARQ process numbers. Generally, the base station and the terminal have known the HARQ process numbers included by the same group number of HARQ process numbers, wherein a process number of each scheduled subframe corresponds to a process number in a group with the group number.

Optionally, the multiple scheduled downlink subframes provide the ACK/NACK feedback together through the PUCCH.

Optionally, the DCI is carried through a PDCCH or an ePDCCH.

Optionally, the DCI is transmitted on M predefined subframes, wherein the M is a positive integer.

Optionally, when the DCI is the scheduling information related to the downlink data channel (PDSCH), the downlink data channel is transmitted on the M subframes transmitting the DCI, or the downlink data channel is transmitted on K subframes after the M subframes transmitting the DCI, wherein K is a positive integer;

when the DCI is the scheduling information related to the uplink data channel (PUSCH), the uplink data channel is transmitted on L subframes after the M subframes transmitting the DCI, wherein L is a positive integer.

Optionally, the uplink subframe transmitting the feedback information of the downlink data channel is determined according to a last downlink subframe transmitting the downlink data channel.

Figure 2:
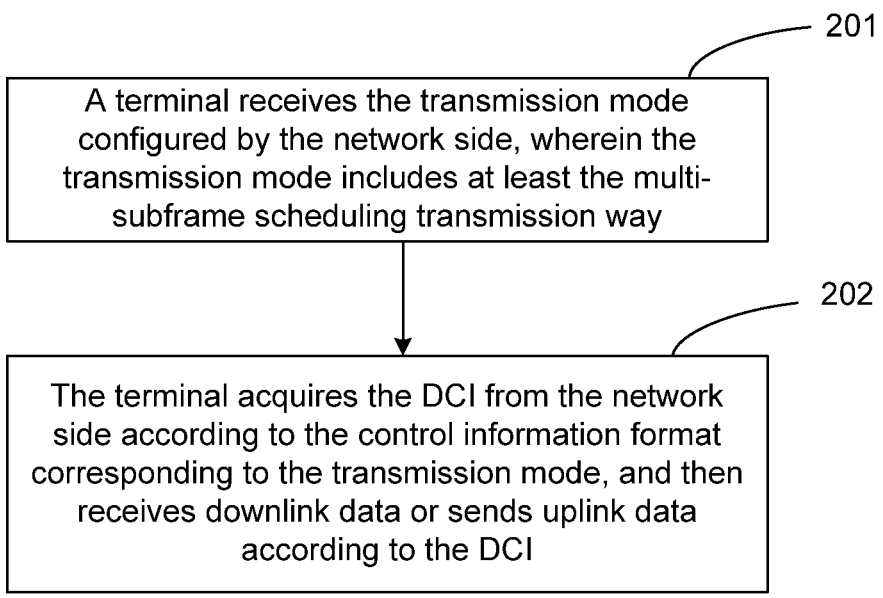
FIG. 2 is a flowchart of a subframe scheduling method according to another embodiment of the disclosure.

The disclosure also provides a subframe scheduling method; as shown in FIG. 2, the method includes the following steps.

Step 201, a terminal receives the transmission mode configured by the network side, wherein the transmission mode includes at least the multi-subframe scheduling transmission way.

Step 202, the terminal acquires the DCI from the network side according to the control information format corresponding to the transmission mode, and then receives the downlink data or sends the uplink data according to the DCI.

Optionally, the transmission mode differentiates between the single-subframe scheduling and the multi-subframe scheduling by at least one of the following ways:

differentiating through the DCI format;

differentiating through the search space;

differentiating through the subframe indication information in the DCI; and differentiating through the high-layer signalling or the transmission type of the random access channel.

Optionally, the multi-subframe scheduling transmission mode includes:

all the data packets carried by each subframe of the multiple subframes are the new data packets, wherein each new data packet is configured by using the scheduling configuration parameter in the DCI;

or, all the data packets carried by each subframe of the multiple subframes are retransmitted data packets, wherein each retransmitted data packet is configured by using the scheduling configuration parameter in the DCI;

or, the multiple subframes carry a mixture of new data packets and retransmitted data packets, wherein the new data packets are configured by using the scheduling configuration parameter in the DCI, and the retransmitted data packets are configured by using a scheduling configuration parameter during a previous scheduling or a scheduling configuration parameter during an initial scheduling;

or, each subframe of the multiple subframes transmits a same data packet that is configured by using the scheduling configuration parameter in the DCI.

Optionally, the DCI includes at least one or more of the followings: carrier indicator, resource block indicator, modulation and coding level, power control indicator, group number information of an HARQ process number, and state information of a scheduled subframe; wherein the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit data packets.

Optionally, the scheduled subframe includes: N predefined consecutive or discrete subframes (e.g., the N can be fixed at 4, a discrete interval is fixed at 2, or the scheduled subframes are fixed to be 1, 2, 3, 4 or 6, 7, 8, 9); or subframes indicated by the subframe scheduling information in the DCI, wherein the subframe scheduling information includes: the starting subframe number and the finishing subframe number of scheduled subframes; or, the starting subframe number and a number of consecutively scheduled subframes; or, a number of consecutively scheduled subframes after a subframe where the DCI is.

Optionally, the multiple scheduled subframes share a same group number of HARQ process number, wherein a process number of each scheduled subframe corresponds to a process number in a group with the group number.

Optionally, the multiple scheduled downlink subframes provide an ACK/NACK feedback together through a PUCCH.

Optionally, the DCI is transmitted on M predefined subframes, wherein the M is a positive integer.

Optionally, when the DCI is the scheduling information related to the downlink data channel (PDSCH), the downlink data channel is transmitted on the M subframes transmitting the DCI, or the downlink data channel is transmitted on K subframes after the M subframes transmitting the DCI, wherein K is a positive integer;

when the DCI is the scheduling information related to the uplink data channel (PUSCH), the uplink data channel is transmitted on L subframes after the M subframes transmitting the DCI, wherein L is a positive integer.

Optionally, the uplink subframe transmitting the feedback information of the downlink data channel is determined according to a last downlink subframe transmitting the downlink data channel.

Figure 3:
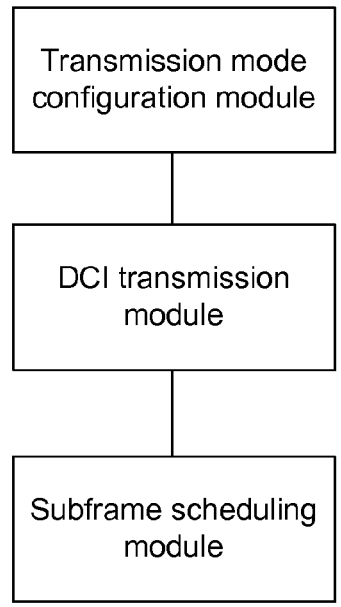
FIG. 3 is a structural diagram of a network device according to an embodiment of the disclosure.

The disclosure also provides a network device accordingly; as shown in FIG. 3, the network device includes: a transmission mode configuration module, a downlink control information transmission module and a subframe scheduling module; wherein, the transmission mode configuration module is configured to configure a transmission mode, wherein the transmission mode includes at least the multi-subframe scheduling transmission way;

the downlink control information transmission module is configured to select a corresponding control information format according to the transmission mode, and transmit the DCI corresponding to the control information format to a terminal; and the subframe scheduling module is configured to perform subframe scheduling according to the DCI.

Figure 4:
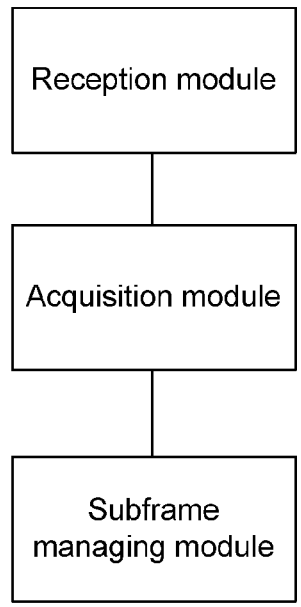
FIG. 4 is a structural diagram of a terminal according to an embodiment of the disclosure.

The disclosure also provides a terminal accordingly; as shown in FIG. 4, the terminal includes: a reception module, an acquisition module and a subframe managing module; wherein, the reception module is configured to receive a transmission mode configured by the network side, wherein the transmission mode includes at least the multi-subframe scheduling transmission way;

the acquisition module is configured to acquire the DCI from the network side according to the control information format corresponding to the transmission mode; and the subframe managing module is configured to receive downlink data or send uplink data according to the DCI.

The disclosure also provides a subframe scheduling system accordingly; the system includes the aforementioned network device and the aforementioned terminal.

For making the technical solutions of the disclosure more clear, the disclosure is further elaborated below in combination with the accompanying drawings and embodiments. Note that, embodiments and ways in the embodiments in the application can be combined with each other on condition of not conflicting.

Embodiment 1

The present embodiment elaborates a multi-subframe scheduling method provided by the disclosure, which is applied to downlink data transmission in an FDD system.

The specific processing steps of the base station side are shown in FIG. 1, wherein, preferably, the base station indicates that the multi-subframe scheduling instead of the traditional single-subframe scheduling is used by one of the following four ways:

the first way: differentiating through the DCI format of the transmission mode; two DCI formats are defined for the transmission mode, one of which is used for the single-subframe scheduling, the other is used for the multi-subframe scheduling; the base station indicates that the multi-subframe scheduling is used by selecting the DCI format of the multi-subframe scheduling;

the second way: differentiating through the search space of the transmission mode whether the single-subframe scheduling or the multi-subframe scheduling is used; the public search space includes the related configuration parameter of the single-subframe scheduling, the user-specific search space includes the configuration parameter of the multi-subframe scheduling; the base station indicates that the multi-subframe scheduling is used by only configuring the user-specific search space;

the third way: displaying through the subframe indication information in the DCI indication about whether the single-subframe scheduling or the multi-subframe scheduling is used; during the multi-subframe scheduling, there must be multiple scheduled subframes; but there is only one scheduled subframe during the single-subframe scheduling; and the fourth way: differentiating through the high-layer signalling or the transmission type of the random access channel.

Preferably, the DCI can schedule multiple consecutive or discrete subframes.

Preferably, the resource block of each subframe of the multiple subframes carries an independent new data packet or retransmitted data packet of a same user.

Preferably, there are also four situations about the multiple subframes carrying the data packet and about the scheduling configuration parameter as follows:

the first situation: all the data packets carried by each subframe of the multiple subframes are the new data packets, wherein each new data packet is configured by using the scheduling configuration parameter in the DCI;

the second situation: all the data packets carried by each subframe of the multiple subframes are the retransmitted data packets, wherein each retransmitted data packet is configured by using the scheduling configuration parameter in the DCI;

the third situation: the multiple subframes carry a mixture of new data packets and retransmitted data packets, wherein the new data packet is configured by using the scheduling configuration parameter in the DCI, and the retransmitted data packet is configured by using the scheduling configuration parameter during a previous scheduling or a scheduling configuration parameter during an initial scheduling; and the fourth situation: each subframe of the multiple subframes transmits a same data packet, wherein the data packet is configured by using the scheduling configuration parameter in the DCI.

Preferably, the scheduling configuration parameters include: carrier indicator, resource block indicator, modulation and coding level, power control indicator, group number information of an HARQ process number, and state information of a scheduled subframe; wherein, the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit the data packets.

Preferably, the subframe indication information is used for indicating the specific scheduled subframe and whether the data packet transmitted by the subframe is the new data packet or the old data packet, specifically including the following two ways:

the first way: dividing the subframes into a number of groups by predefining, each group includes a number of subframes, and the subframe numbers in each group can be overlapped, consecutive or inconsecutive; the base station selects a proper group to schedule according to a transmitted data volume, and informs, through physical signalling, a terminal of the group number of the scheduled subframe; in addition, each scheduled subframe defines 1-bit information to indicate whether it is a new data packet or an old data packet; and the second way: the base station identifies through the DCI the scheduling situation of each subframe after the subframe where the DCI is, that is, each subsequent subframe defines 2-bit information to represent three states of a transmission resource block: transmitting the new data packet, transmitting the old data packet, not transmitting, namely not scheduled subframe.

Preferably, if the scheduled subframes are multiple consecutive subframes, then the subframe indication also includes one of the following three ways:

the first way: the subframe indication information provides the starting subframe number and the finishing subframe number of scheduled subframes, or the starting subframe number and a number of the consecutively scheduled subframes;

the second way: the subframe indication information only provides a number of the consecutively scheduled subframes except the subframe where the DCI is; and the third way: the subframe indication information only provides indication about the new data packet or the old data packet; the number of the consecutively scheduled subframes is a preset fixed value.

Preferably, as to downlink, the scheduling configuration parameters also include group number information of the HARQ process number.

Preferably, the multiple subframes share a same group number of HARQ process numbers.

Preferably, the base station and the terminal have known HARQ process numbers included by the group number of the HARQ process numbers; by default, process numbers of scheduled subframes correspond in sequence to respective process numbers in a group with the group number.

Preferably, the base station carries the DCI through the PDCCH or the ePDCCH

Preferably, the multiple subframes include the subframe where control signalling is and the multiple subframes after this subframe, or the multiple subframes after the subframe where the control signalling is.

Preferably, the multiple scheduled downlink subframes provide the ACK/NACK feedback together through the PUCCH.

For making the above specific technical points of the disclosure more clear, the above specific problems are elaborated below through some application examples.

APPLICATION EXAMPLE 1

The present application example elaborates a newly defined transmission mode.

Firstly, the system defines a new transmission mode, for example, the transmission mode X. This transmission mode can only be used for the multi-subframe scheduling, or can be used for both the multi-subframe scheduling and the single-subframe scheduling. For the way that the transmission mode can be used for both the multi-subframe scheduling and the single-subframe scheduling, the base station can configure according to different situations, which improving the scheduling flexibility and the system compatibility.

For the situation that both the single-subframe scheduling and the multi-subframe scheduling can be performed, the base station can differentiate between the single-subframe scheduling and the multi-subframe scheduling by the following ways.

The first way: differentiating through the DCI format of the transmission mode. The defined transmission mode X includes two DCI formats, namely DCI format 1A and DCI format 1F. The DCI format 1A is the original DCI format for the single-subframe scheduling, and the DCI format 1F is a redefined DCI format special for the multi-subframe scheduling.

An information bit fields specifically included in the DCI format 1F may be shown in Table 1:

TABLE 1

State information of scheduled subframe
Carrier indicator
Centralized/distributed differentiating identity
Resource block indicator
Modulation and coding level
RV number of multiple subframes
Group number of HARQ process
PUCCH power control Note that, the bit fields shown in the table are only illustrative, and can be modified according to the scheduling configuration parameter actually. It can be seen from the table that the data transmission performance of multiple subframes can be indicated by using only one DCI bit number, thereby saving the original DCI overhead of each subsequent subframe, and saving resources.

The base station sends downlink multi-subframe data and receives uplink multi-subframe data according to the indication of the DCI format 1F. Besides, the terminal knows from the DCI format that whether the single-subframe scheduling data transmission or the multi-subframe scheduling data transmission should be used.

The second way: differentiating whether it is the single-subframe scheduling or the multi-subframe scheduling through the search space of the transmission mode; the public search space corresponds to the related configuration parameter of the single-subframe scheduling, and the user-specific search space corresponds to the configuration parameter of the multi-subframe scheduling. Only the public search space is configured for the single-subframe scheduling, and the user-specific search space is configured for the multi-subframe scheduling. Besides, the DCI is scrambled through a user-specific Cell-Radio Network Temporary Identity (C-RNTI), and mapped to the user-specific search space.

A piece of corresponding User Equipment (UE) detects the DCI according to the single-subframe scheduling transmission way in the public search space, and detects the DCI according to the multi-subframe scheduling transmission way in the user-specific search space; or, the corresponding UE detects the DCI according to the single-subframe scheduling transmission way in the public search space, and detects the DCI according to the single-subframe scheduling transmission way or the multi-subframe scheduling transmission way in the user-specific search space.

In addition, when the transmission mode can support both single-stream transmission and multi-stream transmission, each stream can flexibly select the single-subframe scheduling or the multi-subframe scheduling for transmission.

The transmission mode X can be applied to transmit diversity and support open-loop spatial multiplexing, or support multi-user Multiple Input Multiple Output (MIMO). Besides, port and pilot frequency configuration are not specified and described here, because they are not the key points of the disclosure.

APPLICATION EXAMPLE 2

The present application example is described with respect to conditions of scheduled subframes.

The multiple scheduled subframes can be a number of predefined fixed subframes, for example, several consecutive subframes, such as subframes 1, 2, 3, 4 or 6, 7, 8, 9, or the subframes 1, 2, 3 or 4, 5, 6 or 7, 8, 9, or several discrete subframes, wherein the discrete interval is fixed at 2, such as subframes 2, 4, 6, 8 or subframes 1, 3, 5, 7.

APPLICATION EXAMPLE 3

The present application example illustrates the subframe indication, and the indication uses the first way: grouping by predefining and informing through physical signalling which group of subframes are scheduled specifically.

There are many methods for grouping subframes, for example, the subframes are divided into two groups, the even-numbered subframes are in one group, and the odd-numbered subframes are in one group, and then the physical signalling uses only 1 bit to indicate whether the even-numbered subframes or the odd-numbered subframes are scheduled. Of course, it is also feasible to divide the subframes into a number of groups by predefining; each group includes a number of subframes, and the subframe numbers in each group can be overlapped. Then, it is informed through signalling that which group of subframes are scheduled specifically, it is feasible to inform through Radio Resource Control (RRC) signalling or indicate in the DCI. The method is relatively suitable for discrete subframe scheduling and able to save the signalling overhead of the subframe indication.

For example, the subframes can be grouped by a way shown in the following Table 2:

TABLE 2

| Group number | Subframe numbers included |
|---|---|
| 0 | 2 4 6 8 |
| 1 | 1 2 3 4 5 6 |
| 2 | 1 3 5 7 9 |
| 3 | 2 4 5 6 7 |

Figure 5:
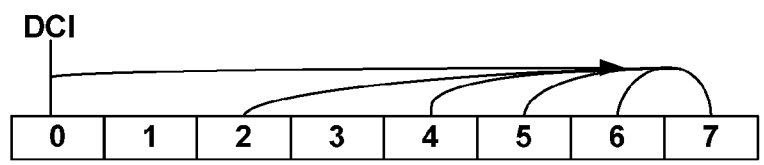
FIG. 5 is a diagram of the multi-subframe scheduling in an application example 3.

As shown in FIG. 5, if the base station is about to schedule the discrete subframes 2, 4, 5, 6, 7 at the subframe 0, the specific subframes to be scheduled can be indicated by using only 2 bits 11.

For the PDSCH of each downlink subframe, both the new data packets and the retransmitted data packets can be transmitted; if all the data packets are the new data packets or all the data packets are the retransmitted data packets, then they only need a public 1-bit New Data Indicator (NDI) to indicate; if the new data packets and the retransmitted data packets are scheduled together, then each data packet needs to define 1 bit to indicate the specific situation. The information is included in the scheduling configuration parameter of the DCI.

APPLICATION EXAMPLE 4

The present example also illustrates the subframe indicating way, and performs the specific subframe indication through signalling in the DCI. Specifically, the way that the control signalling provides the subframe indication information of the multiple subframes is:

providing subframe scheduling identities of multiple consecutive subframes after the subframe where scheduling control information is, and the specific way of identifying each subframe is:

each subframe defines information of 2-bit information to represent three states of the transmission resource block: transmitting the new data packet, transmitting the retransmitted data packet, not transmitting, namely not scheduling the subframe. Specifically, for example, 00 is used for representing the new data packet, 01 is used for representing the retransmitted data packet, and 10 is used for representing that the packet is not scheduled, thus scheduling of discrete subframes and scheduling together of new data packet and the retransmitted data packet can be implemented.

Figures 6, 7:
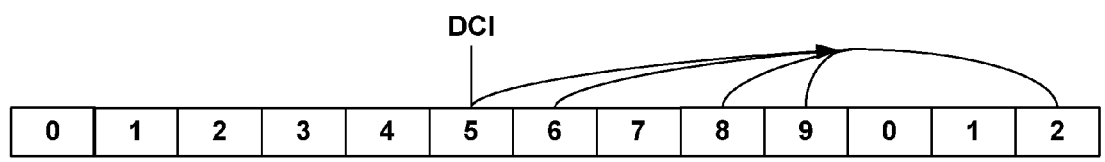
FIG. 6 is a diagram of the multi-subframe scheduling in an application example 4.
FIG. 7 is a diagram of HARQ process number allocation of each downlink subframe of the multi-subframe scheduling in an application example 5.

As shown in FIG. 6, if the base station is about to schedule the discrete subframes 6, 8, 9, 2 at the subframe 5, the subframes 6, 9 transmit the new data packet, and the subframes 8, 2 transmit the retransmitted data packet, then the corresponding DCI should be represented as: 00100100101001.

In addition, there are two possibilities of DCI time domain distribution of the multi-subframe scheduling as follows:

the first possibility: each subframe includes the DCI of multi-subframe scheduling; and the second possibility: only some subframes include the DCI of multi-subframe scheduling. Thus, the UE only needs to perform blind detection to its control information on some predefined subframes.

Furthermore, the base station can separately transmit the downlink control information and data through the subframes; some subframes only transmit the control information, and the rest subframes directly transmit the data.

For example, the base station carries the control information of the multi-subframe scheduling on only the PDCCH or the ePDCCH of the downlink subframe 0 or the subframe 5, and then the scheduled data are on the other multiple consecutive or discrete subframes.

For the ePDCCH, frequency resources of system bandwidth are multiplexed by a way of frequency division with the PDSCH.

APPLICATION EXAMPLE 5

The present application example illustrates a subframe indicating method for scheduling multiple consecutive subframes.

As shown in FIG. 7, it is assumed that a piece of DCI is about to schedule the subsequent 4 consecutive subframes, and all resource locations corresponding to the four subframes transmit the new data packets A, B, C and D, then if the indicating way of the above second way is used, each subframe defines 2-bit information to represent three states of the transmission resource block: transmitting the new data packet, transmitting the retransmitted data packet, and not transmitting, then it is needed to add 8 bits in the DCI format to indicate the situation of the packets transmitted at resource locations corresponding to respective subframes, for example, it is represented by 00000000.

In addition, for the situation that the multiple subframes to be scheduled is the consecutive subframes, the following way can be used:

the control information includes a starting subframe number and a finishing subframe number or provides the starting subframe number and a number of consecutively scheduled subframes, thus cross-subframe scheduling can be supported.

In addition, if the cross-subframe scheduling cannot be supported, it is only needed to provide the number of the subsequent subframes transmitted consecutively except a present subframe. For the situation shown in FIG. 7, using only 2 bits 11 can indicate the present subframe and the subsequent consecutive 3 subframes to be scheduled.

However, it is needed to define 1 bit to indicate the situation whether each packet is a new data packet or a retransmitted data packet.

Here, for saving the control signalling overhead, the original bit field in the DCI can be compressed to carry the above information.

Furthermore, if the number of the subframes transmitted consecutively is set as a preset fixed value, then it is not needed to add DCI bits.

APPLICATION EXAMPLE 6

The present application example illustrates configuration information of scheduled subframe.

The scheduling configuration parameters include carrier indicator, resource block indicator, modulation and coding level, and power control indicator, and should at least include resource location information. The scheduling configuration parameters can be configured according to specific conditions, for example, for saving the signalling overhead, more scheduling configuration parameters can be included; in addition, if it is desired to improve the scheduling flexibility, fewer scheduling configuration parameters can be included.

All the data packets carried by each subframe of the multiple subframes are the new data packets, wherein each new data packet is configured by using the scheduling configuration parameter in the DCI;

or, all the data packets carried by each subframe of the multiple subframes are the retransmitted data packets, wherein each retransmitted data packet is configured by using the scheduling configuration parameter in the DCI;

or, the multiple subframes carry the a mixture of new data packets and retransmitted data packets, wherein the new data packet is configured by using the scheduling configuration parameter in the DCI, and the retransmitted data packet is configured by using the scheduling configuration parameter during a previous scheduling or a scheduling configuration parameter during an initial scheduling.

In addition, the default RV value of the new data packets is 0. The RV value of the old data packets is separately given for each packet.

APPLICATION EXAMPLE 7

The present application example illustrates allocation of the HARQ process numbers of scheduled subframes.

For the problem about how to configure the HARQ of scheduled subframes, a method used by the disclosure is specifically as follows: grouping the HARQ process numbers by a predetermined way, and the process numbers included in each group can be overlapped.

The grouping situation here may be shown in Table 3:

TABLE 3

| Group number | Process numbers included |
| --- | --- |
| 0 | 1 2 4 6 |
| 1 | 2 3 4 5 |
| 2 | 1 3 5 7 |
| 3 | 4 5 6 7 |
| 4 | 3 5 7 0 |
| 5 | 2 3 5 4 |
| 6 | 4 5 7 1 |
| 7 | 0 2 4 6 |

Note that, Table 3 is only an example of grouping; actually, the process numbers can be divided into more groups, such as 16 groups, or fewer groups, such as 4 groups.

Then, the base station configures the group numbers of the HARQ process numbers in the DCI bit field, for example, 001 represents that the selected process group number is 1, and the process numbers used by four subframes correspond in sequential to the process numbers included in the group, that is, the process numbers used by the data packets corresponding to the subframes 0, 1, 2, 3 are respectively 2, 3, 4, 5, as shown in FIG. 7.

Figure 8:
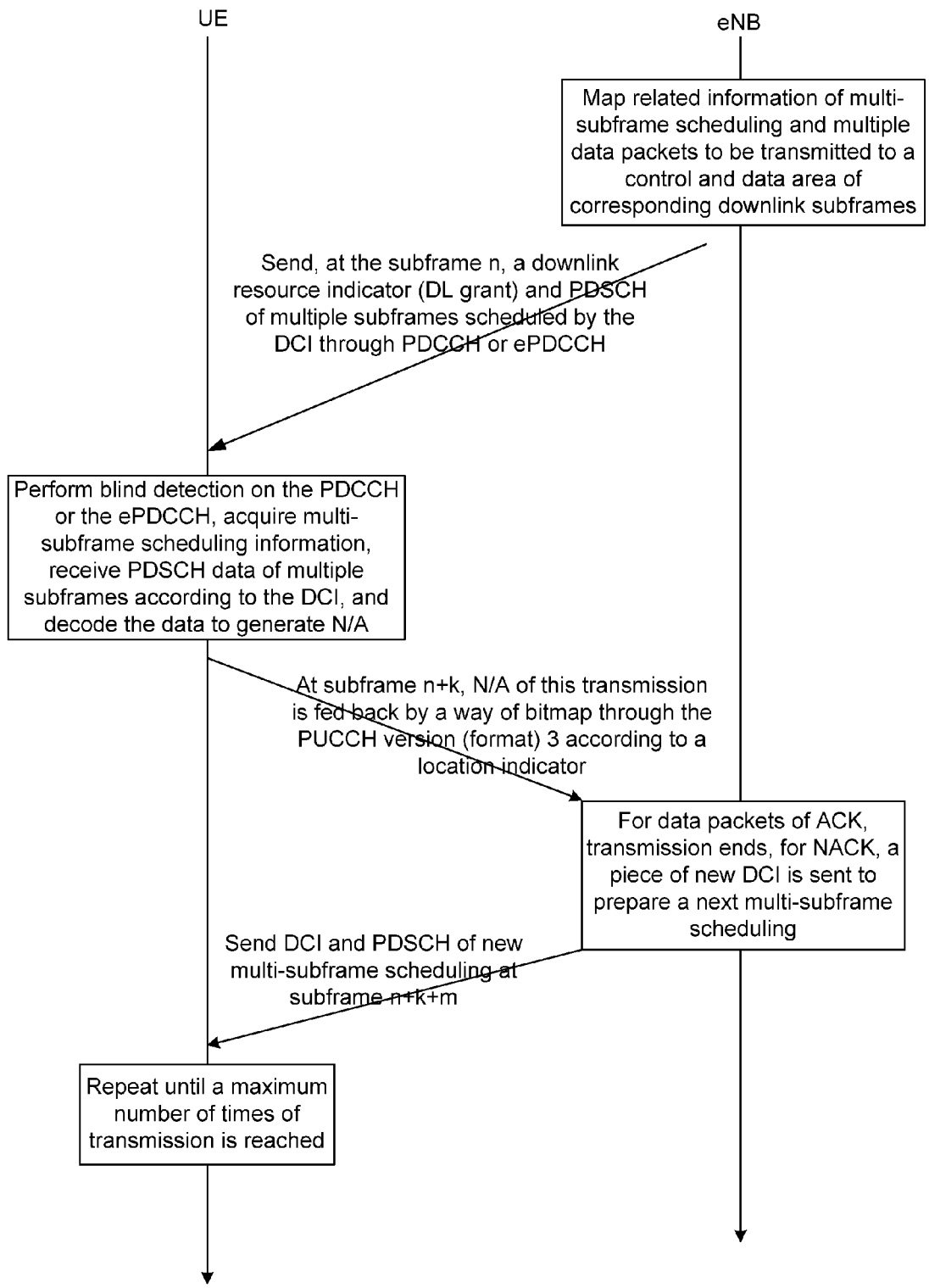
FIG. 8 is a specific transmission process of downlink multi-subframe data in an application example 7.

The specific transmission process of downlink multi-subframe data is shown in FIG. 8.

Firstly, the base station sends the multi-subframe scheduling transmission way through the PDCCH or the ePDCCH, and includes the related scheduling configuration information of the multiple subframes in the DCI.

Here, DCI corresponding to DL grant needs to be modified to include some configurations of the multi-subframe scheduling, such as multi-subframe indication, specific situation of each subframe transmission packet, and the group number of the allocated HARQ process numbers.

The base station maps the new data and the old data on corresponding resource blocks of a PDSCH of each subframe according to the indication of the multi-subframe scheduling configuration parameter, and then sends the corresponding control information and data information through a PDCCH or ePDCCH and the PDSCH.

Wherein, the DCI can be transmitted on the PDCCH or the ePDCCH of multiple consecutive or discrete subframes. The data information is transmitted on the PDSCH of multiple subframes which transmit the DCI or on a PDSCH of multiple subframes after the subframe where the control information is.

Then, the terminal performs blind detection of its DCI on the corresponding subframe, determines the multi-subframe scheduling through the DCI format or the search space, and acquires the related information of multi-subframe scheduling.

Each subframe obtains the corresponding HARQ process number according to the allocated HARQ process numbers and a sequence number in the group, and receives and demodulates, according to scheduling parameter configuration information, downlink data on corresponding resource block locations of the PDSCH of 4 consecutive subframes.

The terminal determines the timing relationship according to a last downlink subframe transmitting downlink data channel. Besides, ACK/NACK information of this multi-subframe scheduling is fed back to a receiving result of corresponding data packets of four subframes by the way of PUCCH format 3 bitmap. For example, as shown in FIG. 7, feedback bit here is 1001 which represents that the data packets on the HARQ process numbers 2, 5 corresponding to the subframes 0, 4 are transmitted correctly, then the base station can release this process; the data packets on the HARQ process numbers 3, 4 corresponding to the subframes 1, 2 are transmitted by error, then the base station is required to retransmit the two data packets.

Then, after receiving the information fed back by the PUCCH, the base station arranges next data transmission of multi-subframe scheduling based on the result; in order to ensure that the retransmitted data packets and the firstly transmitted data packets use the same HARQ process number during the next scheduling, the HARQ group numbers used by the multi-subframe scheduling should include the process numbers 3, 4, and the sequence in the group corresponds to the corresponding subframes. Here, the group number 1 can be used continuously or a new group number 5 is used; the other two subframes can transmit new data packets or other error retransmitted data packets.

In FIG. 7, taking that the HARQ group number allocated next time is 5 as an example, the processes whose numbers are 3, 4 continue retransmitting the redundancy versions of the original data packets C, D. The processes whose numbers are 2, 5 start to retransmit the new data packets E, F.

The above process is repeated like this until all the data packets of the user are transmitted correctly.

In the present embodiment, the data packets of multiple downlink subframes are scheduled by using a piece of control information, which saves the subsequent overhead of original control information, and improves the spectrum efficiency of the system. Besides, it is allowed to switch between the single-subframe scheduling and the multi-subframe scheduling, thereby improving the scheduling flexibility and the compatibility of the original system.

Embodiment 2

The present embodiment still elaborates the multi-subframe scheduling method provided by the disclosure, which is applied to uplink data transmission under an FDD system.

The processing steps of the terminal side are shown in FIG. 2, wherein, there can be several ways of obtaining the indication about the specific multiple subframes to be scheduled as follows.

The first way: grouping the subframes by a predefining; the number of subframes in each group can be different, and the control information includes the specific group number.

For example, the even-numbered subframes are in a group, and the odd-numbered subframes are in on group; then only 1 bit in the DCI is needed for indication. Thus, the discrete subframe scheduling can be realized.

Here, for the difference between the subframe numbers of the multi-subframe scheduling, it is best not to exceed 8.

The second way: the terminal first knows the multi-subframe transmission from a new transmission mode, and then acquires specific subframe configuration information through signalling indication in the received DCI.

In addition, the base station may separately transmit the downlink control information and data through the subframes; some subframes only transmit the control information, and the rest subframes directly transmit the data.

That is, there are two possibilities of DCI time domain distribution of each terminal as follows:

the first possibility: each subframe includes the DCI of the terminal; and the second possibility: only some subframes include the DCI of multi-subframe scheduling of the user, for example, the subframes 0 and 5. Thus, the terminal only needs to perform blind detection of its control information on the predefined subframes.

Preferably, in order to ensure compatibility with the previous uplink using synchronous timing, it is best that all the subframes can include the DCI multi-subframe scheduling, thus the retransmitted data packets can still be transmitted according to the timing relationship.

For the situation that the multiple uplink subframes to be scheduled are multiple consecutive subframes, there is the following subframe indicating way:

for each terminal, the transmission of uplink data packet can be performed through the single-subframe scheduling or the multi-subframe scheduling. If it is the multi-subframe scheduling, because there is the timing relationship in uplink, the compressed bit field in the DCI can be used for carrying the number of the PUSCH subframes scheduled consecutively.

Furthermore, if each frame has control, and the number of the subframes transmitted consecutively is predefined, then it is not needed to add the DCI bits.

The specific way of identifying each subframe of the multiple subframes to be scheduled is:

modifying the original 1-bit NDI of each subframe to 2-bit information, representing three states of the transmission resource block: transmitting the new data packet, transmitting the retransmitted data packet, not transmitting, namely not scheduling the resource block of the subframe. Specifically, for example, 00 is used for representing the new data packet, 01 is used for representing the retransmitted data packet, and 10 is used for representing that the packet is not scheduled, thus scheduling of discrete subframes and scheduling of new data packets and retransmitted data packets together can be realized. Besides, the default RV of the new data packet is 0.

Wherein the scheduling configuration parameters include some of carrier indicator, resource block indicator, modulation and coding level and power control indicator. The scheduling configuration parameters can be configured according to specific conditions, for example, for saving the signalling overhead, the multiple subframes can use the completely same scheduling configuration parameters; in addition, if it is desired to improve the scheduling flexibility, the same scheduling configuration parameters can be included in multi-subframe scheduling information according to the situation, and different parameters are included separately.

For an uplink HARQ mechanism, because uplink is synchronous, the subframe number represents the corresponding process number; the scheduling configuration parameters do not need to include information of the HARQ process number. Besides, due to the timing relationship, the multiple subframes do not use the way of joint feedback, but each frame provides the ACK/NACK feedback separately.

Figure 9:
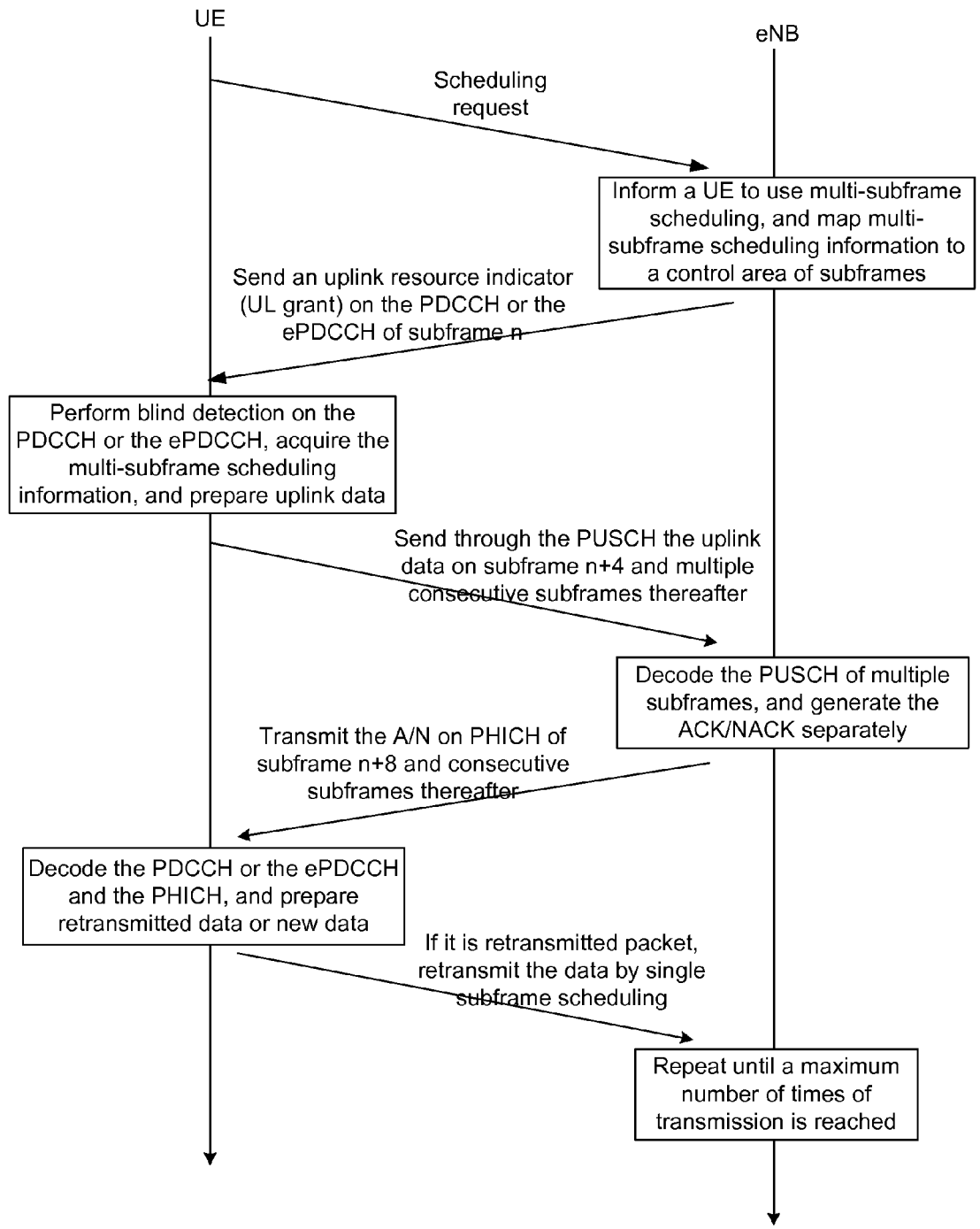
FIG. 9 is a specific transmission process of uplink multi-subframe data in an embodiment 2.

The specific process of transmitting the uplink multi-subframe data is shown in FIG. 9.

Firstly, the terminal sends a scheduling request to the base station to show that there are data to be transmitted.

Then, the base station sends the multi-subframe scheduling transmission way through the high-layer signalling or the physical signalling with the scheduling configuration information of multiple subframes included in the DCI format 0 or 4, or a new DCI format, and then sends at the subframe n the information to the terminal through the PDCCH or the ePDCCH.

Here, DCI corresponding to UL grant needs to be modified to include some configurations of the multi-subframe scheduling, such as indication about number of multiple subframes, and specific situation of each subframe transmission packet.

Wherein the DCI can be transmitted on the PDCCH or the ePDCCH of multiple consecutive or discrete subframes.

Figure 10:
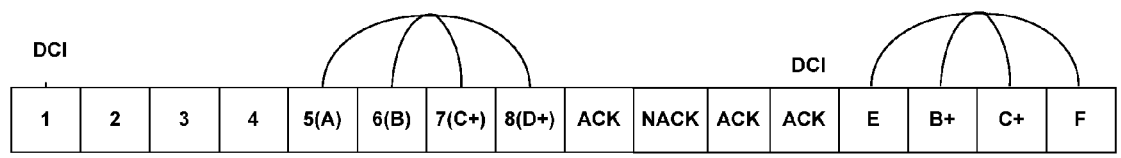
FIG. 10 is a transmission and timing relationship diagram of an uplink multi-data packet in an embodiment 2.

For example, as shown in FIG. 10, the base station sends DCI signalling of multi-subframe scheduling at the subframe 1 to indicate that two new data packets A, B and two old data packets C, D on the corresponding resource blocks of the PUSCH of the four subframes from the subframe 5 to the subframe 8 are scheduled consecutively. Then, the original 1-bit NDI in the DCI format is modified to 2 bits to indicate the situation of the data packets transmitted at the resource location corresponding to each subframe. Here, 8 bits 00000101 are needed for representation.

The scheduling configuration parameters include resource configuration parameters and transmission parameters, such as a type of resource allocation, resource block indicator, MCS level and TPC command.

Then, the UE performs blind detection of the DCI multi-subframe scheduling information at the subframe n, and sends, according to UL grant configuration information and the timing relationship of the subframe, the uplink data on the same frequency domain resources of the PUSCH of the corresponding subframe n+4 and multiple consecutive subframes after the subframe n+4.

Then, after receiving the four subframes in order, the base station performs decoding to generate the ACK/NACK, and feeds back the ACK/NACK on a Physical HARQ Indicator Channel (PHICH) of the subframes n+8, n+8+1, n+8+2 and n+8+3.

The terminal determines whether to transmit the new data packets or the retransmitted data packets the next time according to the received NDI in the PHICH or the DCI. If the NDI is equal to 1, then the new data packets are transmitted; if the NDI is equal to 0, then the UE is desired to continue to retransmit the previous data packets on the corresponding single subframe according to the timing relationship, until the base station feeds back the ACK.

For example, as shown in FIG. 10, for the data packets of the multiple uplink subframes, which are consecutively transmitted by the terminal at the subframes 5,6, and 8, the base station feeds back the ACK/NACK at the subframes 9, 10, 11 and 12 successively according to the decoding situation, and sends information of a new multi-subframe scheduling transmission way at the subframe 12, wherein the information includes the NDI of each subframe. The terminal performs the next transmission of the data packets of the multiple uplink subframes according to scheduling indicator information.

Of course, the base station can also schedule multiple discrete uplink subframes.

It can be seen from the present embodiment that uplink can also save the control signalling overhead of the previous UL grant by using the multi-subframe scheduling method of the disclosure.

Although the above embodiment illustrates by taking the FDD system for example, the multi-subframe scheduling transmission way can also be applied to a TDD system.

It can be seen from the above embodiment that the multi-subframe scheduling method provided by the present embodiment of the disclosure can save a large amount of DCI overhead, no matter for scheduling uplink data or transmitting the downlink data; even the subsequent subframes do not have the previous DCI, the data transmission can still be performed successfully according to the previous signalling configuration, the terminal can also receive or send the corresponding data successfully, thereby improving the resource utilization rate. Besides, the coverage performance can also be improved by consecutively allocating multiple subframes to the UE.

Embodiment 3

The present embodiment illustrates the situation of a subframe where the DCI is and multiple subframes to be scheduled.

The DCI for multi-subframe scheduling can be transmitted on a predefined subframe or on multiple subframes;

the multiple predefined subframes are preferably M consecutive subframes or M discrete subframes.

The specific application is that: the M consecutive subframes can be some of the subframes 0, 1, 2, 3, 4, 5, 6, 7, 8, and 9, or several discrete subframes.

When the DCI is scheduling information related to the downlink data channel, the downlink data channel is transmitted on one or more subframes transmitting the DCI, or the downlink data channel is transmitted on one or more subframes after the subframe transmitting the DCI;

when the DCI is scheduling information related to the uplink data channel, the uplink data channel is transmitted on one or more subframes after the subframe transmitting the DCI.

The uplink subframe transmitting the feedback information of the downlink data channel is determined according to a last downlink subframe transmitting the downlink data channel;

wherein each subframe of the multiple subframes transmits a same data packet.

It can be seen from the above embodiment that the multi-subframe scheduling method provided by the present embodiment of the disclosure can improve the coverage performance, by consecutively allocating multiple subframes to the UE, for both scheduling of uplink data and transmission of downlink data.

The above is only the preferred embodiment of the disclosure and not intended to limit the disclosure; for the skilled personnel in the field, the disclosure may have various modifications and changes. Any modifications, equivalent replacements, improvements and the like within the spirit and principle of the disclosure shall fall within the scope of the claims of the disclosure.

The invention claimed is:

1. A subframe scheduling method, comprising:
configuring, by a network side, a transmission mode, wherein the transmission mode comprises at least a multi-subframe scheduling transmission way; and
selecting, by the network, a corresponding control information format according to the transmission mode, transmitting Downlink Control Information (DCI) corresponding to the control information format, and then performing subframe scheduling according to the DCI,
wherein the multi-subframe scheduling transmission way comprises: all data packets carried by each subframe of multiple subframes being new data packets, all the data packets carried by each subframe of the multiple subframes being retransmitted data packets, all the data packets carried by each subframe of the multiple subframes being retransmitted data packets and each subframe of the multiple subframes transmitting a same data packet, wherein
when all data packets carried by each subframe of multiple subframes are new data packets, each new data packet is configured by using a scheduling configuration parameter in the DCI;
when all the data packets carried by each subframe of the multiple subframes are retransmitted data packets, each retransmitted data packet is configured by using the scheduling configuration parameter in the DCI;
when the multiple subframes carry a mixture of new data packets and retransmitted data packets, the new data packets are configured by using the scheduling configuration parameter in the DCI, and the retransmitted data packets are configured by using a scheduling configuration parameter during a previous scheduling or a scheduling configuration parameter during an initial scheduling;
when each subframe of the multiple subframes transmits a same data packet, the same data packet is configured by using the scheduling configuration parameter in the DCI,
wherein the DCI comprises at least one or more of: carrier indicator, resource block indicator, modulation and coding level, power control indicator, group number information of a Hybrid Automatic Repeat Request (HARQ) process number, and state information of a scheduled subframe;
wherein the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit data packets.

2. The method according to claim 1, wherein the transmission mode differentiates between single-subframe scheduling and multi-subframe scheduling by at least one of the following ways:
differentiating through a DCI format;
differentiating through a search space;
differentiating through subframe indication information in the DCI; and
differentiating through high-layer signalling or the transmission type of a random access channel.

3. The method according to claim 1, wherein the scheduled subframe comprises more than one predefined consecutive or discrete subframes, or subframe(s) indicated by subframe scheduling information in the DCI;
wherein the subframe scheduling information comprises: a starting subframe number and a finishing subframe number of scheduled subframes, or the starting subframe number and a number of consecutively scheduled subframes, or a number of consecutively scheduled subframes after a subframe where the DCI is.

4. The method according to claim 1, wherein multiple scheduled subframes share a same group number of HARQ process numbers; and a process number of each scheduled subframe corresponds to a process number in a group with the group number.

5. The method according to claim 1, wherein multiple scheduled downlink subframes provide an Acknowledgement (ACK)/Negative Acknowledgement (NACK) feedback together through a Physical Uplink Control Channel (PUCCH).

6. The method according to claim 1, wherein the DCI is transmitted on one or more predefined subframes.

7. The method according to claim 6, wherein,
when the DCI is scheduling information related to a downlink data channel, the downlink data channel is transmitted on one or more subframes transmitting the DCI, or the downlink data channel is transmitted on one or more subframes after the subframe(s) transmitting the DCI;
when the DCI is scheduling information related to an uplink data channel, the uplink data channel is transmitted on one or more subframes after the subframe(s) transmitting the DCI.

8. The method according to claim 7, wherein,
an uplink subframe transmitting feedback information of the downlink data channel is determined according to a last downlink subframe transmitting the downlink data channel.

9. A subframe scheduling method, comprising:
receiving, by a terminal, a transmission mode configured by a network side, wherein the transmission mode comprises at least a multi-subframe scheduling transmission way;
acquiring, by the terminal, Downlink Control Information (DCI) from the network side according to a control information format corresponding to the transmission mode, and then receiving downlink data or sending uplink data according to the DCI,
wherein the multi-subframe scheduling transmission way comprises: all data packets carried by each subframe of multiple subframes being new data packets, all the data packets carried by each subframe of the multiple subframes being retransmitted data packets, all the data packets carried by each subframe of the multiple subframes being retransmitted data packets and each subframe of the multiple subframes transmitting a same data packet, wherein
when all data packets carried by each subframe of multiple subframes are new data packets, each new data packet is configured by using a scheduling configuration parameter in the DCI;
when all the data packets carried by each subframe of the multiple subframes are retransmitted data packets, each retransmitted data packet is configured by using the scheduling configuration parameter in the DCI;
when the multiple subframes carry a mixture of new data packets and retransmitted data packets, the new data packets are configured by using the scheduling configuration parameter in the DCI, and the retransmitted data packets are configured by using a scheduling configuration parameter during a previous scheduling or a scheduling configuration parameter during an initial scheduling;
when each subframe of the multiple subframes transmits a same data packet, the same data packet is configured by using the scheduling configuration parameter in the DCI,
wherein the DCI comprises at least one or more of: carrier indicator, resource block indicator, modulation and coding level, power control indicator, group number information of a Hybrid Automatic Repeat Request (HARQ) process number, and state information of a scheduled subframe;
wherein the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit data packets.

10. The method according to claim 9, wherein the transmission mode differentiates between single-subframe scheduling and multi-subframe scheduling by at least one of the following ways:
differentiating through a DCI format;
differentiating through a search space;
differentiating through subframe indication information in the DCI; and
differentiating through high-layer signalling or the transmission type of a random access channel.

11. The method according to claim 9, wherein the scheduled subframe comprises more than one predefined consecutive or discrete subframes, or the subframe(s) indicated by subframe scheduling information in the DCI;
wherein the subframe scheduling information comprises: a starting subframe number and a finishing subframe number of scheduled subframes, or the starting subframe number and a number of consecutively scheduled subframes, or a number of consecutively scheduled subframes after a subframe where the DCI is.

12. The method according to claim 9, wherein multiple scheduled subframes share a same group number of HARQ process numbers; a process number of each scheduled subframe corresponds to a process number in a group with the group number.

13. The method according to claim 9, wherein multiple scheduled downlink subframes provide an Acknowledgement (ACK)/Negative Acknowledgement (NACK) feedback together through a Physical Uplink Control Channel (PUCCH).

14. The method according to claim 9, wherein the DCI is transmitted on one or more predefined subframes.

15. The method according to claim 14, wherein,
when the DCI is scheduling information related to a downlink data channel, the downlink data channel is transmitted on one or more subframes transmitting the DCI, or the downlink data channel is transmitted on one or more subframes after the subframe(s) transmitting the DCI;
when the DCI is scheduling information related to an uplink data channel, the uplink data channel is transmitted on one or more subframes after the subframe(s) transmitting the DCI.

16. The method according to claim 15, wherein,
an uplink subframe transmitting feedback information of the downlink data channel is determined according to a last downlink subframe transmitting the downlink data channel.

17. A network device, comprising:
a processor; and
a memory for storing instructions executable by the processor;
wherein the processor is configured to:
configure a transmission mode, wherein the transmission mode comprises at least a multi-subframe scheduling transmission way;
select a corresponding control information format according to the transmission mode, and transmit Downlink Control Information (DCI) corresponding to the control information format to a terminal; and
perform subframe scheduling according to the DCI,
wherein the multi-subframe scheduling transmission way comprises: all data packets carried by each subframe of multiple subframes being new data packets, all the data packets carried by each subframe of the multiple subframes being retransmitted data packets, all the data packets carried by each subframe of the multiple subframes being retransmitted data packets and each subframe of the multiple subframes transmitting a same data packet, wherein
when all data packets carried by each subframe of multiple subframes are new data packets, each new data packet is configured by using a scheduling configuration parameter in the DCI;
when all the data packets carried by each subframe of the multiple subframes are retransmitted data packets, each retransmitted data packet is configured by using the scheduling configuration parameter in the DCI;
when the multiple subframes carry a mixture of new data packets and retransmitted data packets, the new data packets are configured by using the scheduling configuration parameter in the DCI, and the retransmitted data packets are configured by using a scheduling configuration parameter during a previous scheduling or a scheduling configuration parameter during an initial scheduling;
when each subframe of the multiple subframes transmits a same data packet, the same data packet is configured by using the scheduling configuration parameter in the DCI,
wherein the DCI comprises at least one or more of: carrier indicator, resource block indicator, modulation and coding level, power control indicator, group number information of a Hybrid Automatic Repeat Request (HARQ) process number, and state information of a scheduled subframe;
wherein the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit data packets.

18. A terminal, comprising:
a processor; and
a memory for storing instructions executable by the processor;
wherein the processor is configured to:
receive a transmission mode configured by a network side, wherein the transmission mode comprises at least a multi-subframe scheduling transmission way;
acquire Downlink Control Information (DCI) from the network side according to a control information format corresponding to the transmission mode; and
receive downlink data or send uplink data according to the DCI,
wherein the multi-subframe scheduling transmission way comprises: all data packets carried by each subframe of multiple subframes being new data packets, all the data packets carried by each subframe of the multiple subframes being retransmitted data packets, all the data packets carried by each subframe of the multiple subframes being retransmitted data packets and each subframe of the multiple subframes transmitting a same data packet, wherein
when all data packets carried by each subframe of multiple subframes are new data packets, each new data packet is configured by using a scheduling configuration parameter in the DCI;
when all the data packets carried by each subframe of the multiple subframes are retransmitted data packets, each retransmitted data packet is configured by using the scheduling configuration parameter in the DCI;
when the multiple subframes carry a mixture of new data packets and retransmitted data packets, the new data packets are configured by using the scheduling configuration parameter in the DCI, and the retransmitted data packets are configured by using a scheduling configuration parameter during a previous scheduling or a scheduling configuration parameter during an initial scheduling;
when each subframe of the multiple subframes transmits a same data packet, the same data packet is configured by using the scheduling configuration parameter in the DCI,
wherein the DCI comprises at least one or more of: carrier indicator, resource block indicator, modulation and coding level, power control indicator, group number information of a Hybrid Automatic Repeat Request (HARQ) process number, and state information of a scheduled subframe;

wherein the state information of the scheduled subframe represents that the scheduled subframe transmits the new data packets or the scheduled subframe transmits the retransmitted data packets; or, the state information of scheduled subframe represents that the scheduled subframe transmits the new data packets or the scheduled subframe transmits the retransmitted data packets or does not transmit data packets.

19. A subframe scheduling system, comprising the network device according to claim 17 and the terminal according to claim 18.

* * * * *

UNITED STATES PATENT AND TRADEMARK OFFICE
CERTIFICATE OF CORRECTION

PATENT NO. : 9,674,866 B2
APPLICATION NO. : 14/439044
DATED : June 6, 2017
INVENTOR(S) : Xincai Li et al.

It is certified that error appears in the above-identified patent and that said Letters Patent is hereby corrected as shown below:

On the Title Page

Item (74) Attorney, Agent or Firm: Oppedahl Patent Law Firm LLC

Signed and Sealed this
Nineteenth Day of May, 2020

Andrei Iancu
*Director of the United States Patent and Trademark Office*